Patented Dec. 29, 1936

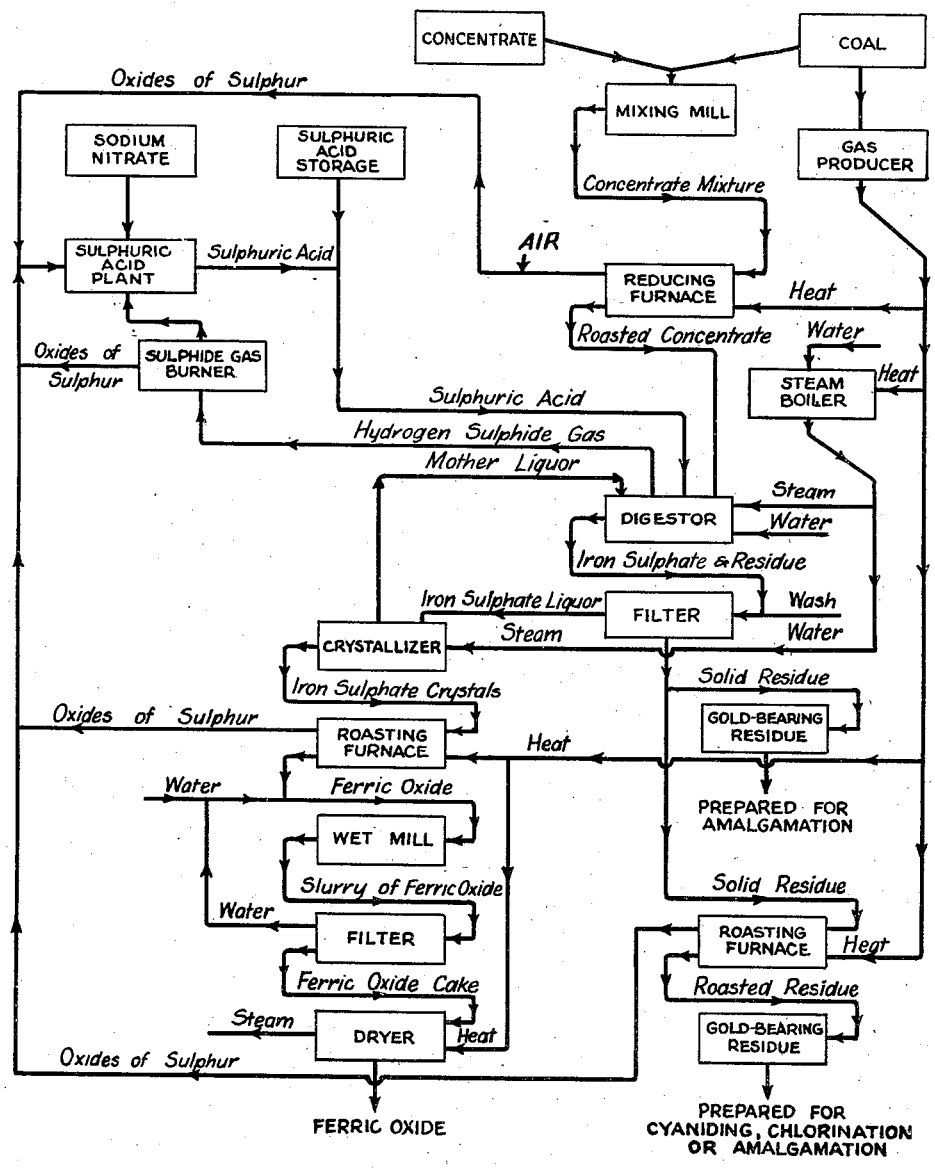

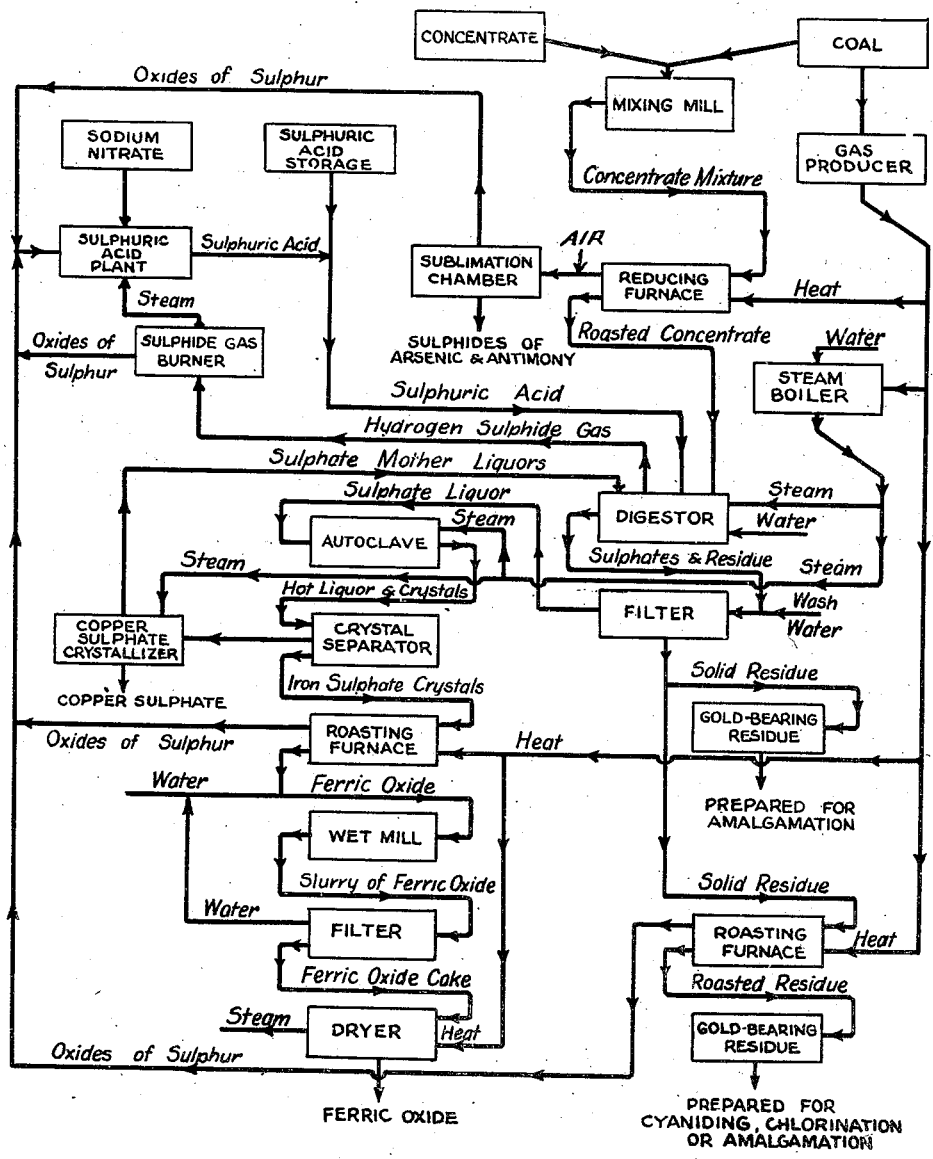

2,065,547

UNITED STATES PATENT OFFICE 2,065,547

METHOD OF TREATMENT OF PYRITIC MATERIALS

Craig R. Arnold, Dahlonega, Ga., and Frank N. Moerk, Philadelphia, Pa.

Application October 20, 1934, Serial No. 749,264

6 Claims. (Cl. 75—83)

This invention is a method of treatment of pyritic materials, such as pyritic ores, concentrates and the like, functioning advantageously for recovering useful ingredients from gold-bearing ore, and while it applies particularly to methods for treatment of gold-bearing pyritic ores, concentrates and the like, it may be employed with other ores, concentrates and the like, as will be understood by those skilled in the art.

It is a known fact that many ore deposits contain gold, but those deposits have never been mined because the cost of extracting the gold has exceeded the value of the gold when extracted. The objects of the present invention are to provide a method of extracting gold upon a commercially economic basis; to provide a method which reduces the costs heretofore encountered; to render the gold extraction more profitable by creation of usable by-products; to retain, so far as possible, a cycle of operations which will utilize products of the process in the further operation of the process; to permit the use in the process of apparatus already upon the market; to secure simplicity in the carrying out of the process; and to obtain other advantages and results as may be brought out in the following discussion.

For assisting in the better understanding of the invention and the cycle of operations embodied therein, we supply herewith a drawing which diagrammatically indicates the various pieces of apparatus employed and their relationship in the process together with an indication of the materials employed and disposition made thereof in the cycle of operations. This drawing represents what is ordinarily referred to in the art as a flow sheet. The drawings comprise two figures, wherein Fig. 1 represents the flow sheet for extraction of gold and by-products from a pyritic ore of the more commonly found iron pyrites, and Fig. 2, represents a flow sheet for ore containing copper pyrite, the sulphides of copper, iron antimony, arsenic, and the like in desirable quantities.

Broadly speaking, the method is one to facilitate the recovery of gold and valuable by-products from gold-bearing pyritic ores and concentrates by decomposing the pyrites and separating the iron and sulphur, whereby a residue is obtained from which the gold may be recovered by known processes and the iron converted into a useful by-product. Preferably the ore or concentrate is ground to a satisfactory fineness, preferably such that it will pass through a sixty mesh screen, and then is roasted under conditions which preclude oxidation. It is preferred, however, before roasting, to mix the concentrate with a reducing agent, such as charcoal, coal, or carbonaceous matter, and to conduct the roasting in such manner as to preclude oxidation of the iron, either in an intermittent or in a continuous furnace at a temperature sufficient to convert the pyrites into metallic sulphides, such as iron sulphide, arsenic sulphide, antimony sulphide, copper sulphide, and so forth. As indicated in Fig. 2, some of these sulphides, such as those of arsenic and antimony may be obtained by sublimation from the gases produced in the reducing furnace. Insofar as the roasting is effected at a temperature sufficient to convert the pyrites into metallic sulphides, and since the operation is performed to preclude oxidation of the iron, the sulphur is likewise not oxidized until the fumes issue from the furnace and come in contact with air, the admission of air being provided for, as shown, as the gas leaves the furnace. The sulphur fumes are allowed to oxidize after leaving the furnace and are saved for use in connection with the production of sulphuric acid.

Following the indication of steps in the process given by the drawings, the concentrate or the ore, after being roasted under the reducing conditions referred to above, passes to a digester into which is introduced diluted sulphuric acid ($H_2SO_4$) which converts the ferrous sulphide (FeS) into soluble ferrous sulphate ($FeSO_4$) and liberates hydrogen sulphide ($H_2S$). This gas is combustible and may be burned with air to form water vapor and the oxides of sulphur, and returned to the cycle for use in the sulphuric acid plant. When the digestion is completed the mass is filtered and washed to separate the ferrous sulphate from the residue which contains the gold. The separation of the ferrous sulphate from the gold-bearing residue may be effected by sedimentation and decantation if desired instead of resorting to filtration, although filtration is to be preferred.

The gold-bearing residue obtained at this point of the description is in such condition as to permit of the extraction of the major portion, if not all, of its gold content by the well known process of amalgamation with metallic mercury.

However, it has been found that in the digestion operation sulphur may be precipitated, probably as the result of the action of the acid on the dissolved hydrogen sulphide or because of the reduction of the sulphuric acid. Since the presence of sulphur and organic or carbonaceous matters interferes with the efficacy of the gold extraction both by cyaniding and by chlorination, and increases the expense thereof, it is desirable to remove these interfering matters. To this end the gold-bearing residue is roasted under oxidizing conditions whereby the carbonaceous matters are consumed, and the sulphur converted into its oxides and returned to the sulphuric acid plant. After this step in the process, the gold may be extracted in suitable manner as by cyaniding, by chlorination, by amalgamation, or by other desired process.

The by-product value of the iron content of the ore or concentrate may be increased by conversion of the resultant ferrous sulphate crystals into the more valuable ferric oxide. It is accordingly an important feature of the present invention to convert the ferrous sulphate into ferric oxide. Concentration by recirculation, evaporation and crystallization of the ferrous sulphate solution indicated in the drawings yields crystals of ferrous sulphate, and it is these crystals that are next converted into ferric oxide. This result is accomplished by roasting the crystals at a temperature sufficiently high to drive off the water of crystallization and to liberate the oxides of sulphur. The resultant residue is a ferric oxide which may then be prepared for market by grinding in water and recovering the oxide by sedimentation or by filtration, thereafter drying the same when it is ready for disposition. The roasting temperature employed is important in that various shades of the oxide may be obtained which range from vermillion to deep purplish-brown, depending upon the roasting temperature.

In event the pyrites have a considerable amount of copper sulphides, the first acid digestion of the roasted mixture of ore contains copper sulphate in addition to the ferrous sulphate. These sulphates may be separated upon concentration by fractional crystallization, or by heating the solution under pressure properly balanced to cause the ferrous sulphate to crystallize or separate, while the copper sulphate remains in solution. After the removal of the ferrous sulphate crystals, the copper sulphate is crystallized and is a desirable by-product of the process.

In the case of gold-bearing arsenical and antimonial pyritic ores the volatile products evolved upon roasting under the reducing conditions heretofore described are mixed with air as they issue from the furnace or retort to convert the sulphur fumes into oxides of sulphur and are passed through a subliming chamber in which the sulphides and any oxides of arsenic and antimony collect, while the oxides of sulphur pass through the chamber and are converted at the sulphuric acid plant into sulphuric acid. The sublimation points or temperatures of the sulphides of arsenic and antimony differ, and by controlling the temperatures in the sublimation chamber or chambers a separation of the sulphides may be effected, or if the temperature is such that simultaneous sublimation occurs, the sulphides may be later separated by chemical means.

For gold-bearing ores containing any or all, or any combination of ingredients specified in the foregoing, corresponding portions of the processes above described may be included for obtaining the desired products and by-products. It is to be understood that according to the present invention the quantity of sulphuric acid depends upon the volatile sulphur content of the ores, upon the amounts of ferrous sulphate converted into ferric oxide, and upon the amount of sulphur precipitated during digestion and volatilized during the roasting of the gold-bearing residue. In some cases it may be in excess of the demands of the process, while in others it may be necessary to employ additional acid. However, the sulphuric acid is a valuable by-product that is produced by and utilized in the process. Furthermore, by the process disclosed the gases evolved, particularly the obnoxious oxide are kept within the cycle of operations gases such as hydrogen sulphide and sulphur di- rather than being liberated to the atmosphere. The hydrogen sulphide gas from the digestion operation may be burned with air to thus obtain a conversion into oxides of sulphur, which in that form is then usable in the production of sulphuric acid. This scheme accordingly converts otherwise offensive gaseous products into a material of value which is needed in this method of treatment of pyritic ores and concentrates.

Obviously, as indicated above, portions of the process may be employed omitting other portions, and the invention contemplates not only the complete combination of steps herein described in full, but contemplates subcombinations thereof and various combinations of the portions thereof, and we accordingly do not wish to confine ourselves to the steps described either in the order given or necessarily inclusive of all of the said steps, except as set forth in the following claims when construed in the light of the prior art.

The invention may be applied, in carrying out the foregoing disclosure, to treatment of a gold-bearing pyritic concentrate, containing, by way of example, 65% iron pyrites and assaying 0.462 ounces of gold per ton. Following the flow sheet of Figure 1, six parts of concentrate may be mixed with one part of coal, ground to a fineness of 60-mesh, and roasted at a temperature between 1300° F. and 1500° F. in a continuous rotating tube furnace to decompose the pyrites. The roasted product, which amounts to substantially 4.67 parts, may now be made into a thin slurry with water to which 6 parts of 60° Baumé sulphuric acid is added, and the mass digested at a temperature just below the boiling point in order to convert the ferrous sulphide content into ferrous sulphate, of which 8.9 parts or thereabouts, should be obtained upon filtration and crystallization. These crystals are, by roasting at a temperature of approximately 1300° F., converted into substantially 2.28 parts of ferric oxide. The dried residue from the digestion operation, which contains substantially all of the gold present in the original concentrate, will yield, according to this example, approximately 2.2 parts and assayed 1.15 ounces of gold per ton.

In practice, where wet extraction or amalgamation is to be employed for recovering the gold, it is not necessary to dry the digested residue as it may be made into a slurry with water and the gold extracted therefrom. Therefore, drying and roasting of the digested residue to remove carbonaceous matters and any sulphur precipitated during digestion is employed only when it is desired to increase the efficiency of gold extraction by chlorination or by cyaniding, and is not at all necessary when amalgamation is to be used to extract the gold.

During the treatment of the above concentrate, sulphur gases are evolved from the several roasting operations and from the acid digestion operation which amount to the equivalent of 5.8 parts of sulphur dioxide for every 6 parts of the concentrate. These gases are convertible into sulphuric acid by the lead chamber process after passing through a dust-removing chamber to remove the suspended particles. With a 90% efficient lead chamber process, nearly twice the amount of sulphuric acid required for our treating process will be produced.

We claim:
1. The method of treating gold-bearing ores or concentrates, comprising roasting the ore or concentrate under reducing conditions, converting the liberated sulphur gases into sulphuric acid, digesting the roasted product with sulphuric acid, recovering ferrous sulphate from the digestion liquor, roasting the digested product under oxidizing conditions, and recovering the gold from the digested and roasted residue.

2. The method of treating gold-bearing ores or concentrates, comprising roasting the ore or concentrate under reducing conditions, converting the liberated sulphur gases into sulphuric acid, digesting the roasted product with sulphuric acid, recovering ferrous sulphate from the digestion liquor and converting it into ferric oxide, roasting the digested product under oxidizing conditions, converting the oxides of sulphur into sulphuric acid, and recovering the gold from the digested and roasted residue.

3. The method of treating gold-bearing ores and concentrates, comprising roasting the ore or concentrate under reducing conditions, converting the liberated sulphur gases into sulphuric acid, digesting the roasted product with sulphuric acid, recovering and separating the sulphates of iron and copper from the digestion liquor, converting the ferrous sulphate into ferric oxide, and recovering the gold from the digested residue.

4. The method of treating gold-bearing ore and/or concentrates, comprising roasting the ore or concentrate under reducing conditions, separating the volatile sulphides from the sulphur gases, converting the sulphur gases into sulphuric acid, digesting the roasted product with sulphuric acid, converting the evolved hydrogen sulphide gas into sulphuric acid, recovering and separating the crystals of ferrous and copper sulphates from the digestion liquor, converting the ferrous sulphate into ferric oxide and recovering the oxides of sulphur therefrom for conversion into sulphuric acid, and extracting the gold from the digested residue.

5. The method of treating gold-bearing ore and/or concentrates, comprising roasting the ore or concentrate under reducing conditions, separating the volatile sulphides from the sulphur gases, converting the sulphur gases into sulphuric acid, digesting the roasted product with sulphuric acid, converting the evolved hydrogen sulphide gas into sulphuric acid, recovering and separating the crystals of ferrous and copper sulphates from the digestion liquor, converting the ferrous sulphate into ferric oxide and recovering the oxides of sulphur therefrom for conversion into sulphuric acid, roasting the digestion residue under oxidizing conditions to remove the interfering sulphur or carbonaceous matter and extracting the gold from the digested residue.

6. The method of treating pyritic ores and/or concentrates, comprising roasting the ore or concentrate under reducing conditions, separating the volatile sulphides from the oxidized sulphur gases, converting the oxidized sulphur gases into sulphuric acid, digesting the roasted product with sulphuric acid, converting the evolved hydrogen sulphide into sulphuric acid, converting the ferrous sulphate in the remaining product into ferric oxide, and recovering oxides of sulphur resultant from the last-mentioned conversion, and converting the last-mentioned oxides of sulphur into sulphuric acid.

CRAIG R. ARNOLD.
FRANK N. MOERK.

CERTIFICATE OF CORRECTION.

Patent No. 2,065,547.	December 29, 1936

CRAIG R. ARNOLD, ET AL.

It is hereby certified that error appears in the printed specification of the above numbered patent requiring correction as follows: Page 2, second column, line 8, strike out the words and syllable "gases such as hydrogen sulphide and sulphur di-" and insert the same after "obnoxious" in line 6; and that the said Letters Patent should be read with this correction therein that the same may conform to the record of the case in the Patent Office.

Signed and sealed this 24th day of August, A. D. 1937.

Leslie Frazer (Seal)	Acting Commissioner of Patents.